United States Patent
Sugawara et al.

(10) Patent No.: US 10,477,652 B2
(45) Date of Patent: Nov. 12, 2019

(54) OPERATING DEVICE, LIGHTING SYSTEM AND NON-TRANSITORY COMPUTER READABLE MEDIUM

(71) Applicant: Panasonic Intellectual Property Management Co., Ltd., Osaka (JP)

(72) Inventors: Hiroshi Sugawara, Hyogo (JP); Yuto Hidaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 159 days.

(21) Appl. No.: 15/448,330

(22) Filed: Mar. 2, 2017

(65) Prior Publication Data

US 2017/0257933 A1   Sep. 7, 2017

(30) Foreign Application Priority Data

Mar. 4, 2016   (JP) .................................. 2016-042642

(51) Int. Cl.
*H05B 37/02*   (2006.01)
*G06F 3/048*   (2013.01)
(Continued)

(52) U.S. Cl.
CPC ..... *H05B 37/0272* (2013.01); *G06F 3/04886* (2013.01); *G06F 3/0488* (2013.01); *G06F 3/04817* (2013.01); *G06F 3/04842* (2013.01)

(58) Field of Classification Search
CPC .......... G06F 3/044; G06F 2203/04112; G06F 3/0414; G06F 3/0488; G06F 3/03547; G06F 2203/04808; G06F 3/038; G06F 3/0421; G06F 3/0428; G06F 3/04817; G06F 3/04886; G06F 3/14
(Continued)

(56) References Cited

U.S. PATENT DOCUMENTS

| | | | |
|---|---|---|---|
| 2010/0153871 A1 | 6/2010 | Yokoyama | |
| 2013/0201176 A1* | 8/2013 | Lee | G09G 5/003 345/214 |

(Continued)

FOREIGN PATENT DOCUMENTS

| | | |
|---|---|---|
| JP | 2009-238399 A | 10/2009 |
| JP | 2012-247861 A | 12/2012 |

(Continued)

*Primary Examiner* — Douglas W Owens
*Assistant Examiner* — Amy X Yang
(74) *Attorney, Agent, or Firm* — McDermott Will & Emery LLP

(57) ABSTRACT

An operating device includes a display, a detector and a determiner. When the detector detects a designated position, the determiner determines whether or not a position corresponding to the designated position in a first layer is within a display region by first image data. When the position is within the display region, the determiner determines that the display region by the first image data is chosen. When the position is not in the display region, the determiner determines whether or not a position corresponding to the designated position in a second layer is within a display region by second image data. When the position in the second layer is within the display region by the second image data, the determiner determines that the display region by the second image data is chosen.

4 Claims, 4 Drawing Sheets

(51) Int. Cl.
  *G06F 3/0488* (2013.01)
  *G06F 3/0481* (2013.01)
  *G06F 3/0484* (2013.01)

(58) Field of Classification Search
  USPC .......................................................... 315/131
  See application file for complete search history.

(56) References Cited

U.S. PATENT DOCUMENTS

| | | | |
|---|---|---|---|
| 2014/0035482 A1* | 2/2014 | Rains, Jr. ........... | H05B 37/0254 315/294 |
| 2014/0070707 A1 | 3/2014 | Nagazoe | |
| 2014/0244044 A1* | 8/2014 | Davis ................ | H05B 37/0272 700/276 |

FOREIGN PATENT DOCUMENTS

| | | |
|---|---|---|
| JP | 2014-056670 A | 3/2014 |
| WO | 2008111531 A1 | 9/2008 |

* cited by examiner

OPERATING DEVICE, LIGHTING SYSTEM AND NON-TRANSITORY COMPUTER READABLE MEDIUM

CROSS REFERENCE TO RELATED APPLICATION

This application claims the benefit and priority of Japanese Patent Application No. 2016-042642, filed on Mar. 4, 2016, the entire contents of which is incorporated herein by reference.

TECHNICAL FIELD

The disclosure relates generally to operating devices, lighting systems and non-transitory computer readable media and, more particularly, to an operating device configured to operate a target group including one or more target devices, a lighting system with the operating device, and a non-transitory computer readable medium that stores a computer program to be executed as a determiner by at least one processor of the operating device.

BACKGROUND ART

In a related touch screen device, it has been proposed to enable a user to operate respective display objects of operation targets with no mishit (mistouch) even if the display objects (e.g., image data containing symbols such as icons and buttons) are superposed or closely displayed on a screen thereof (see JP 2012-247861 A (hereinafter referred to as "Document 1")).

In the touch screen device described in Document 1, the display objects are disposed in respective layers. The touch screen device is configured to switch between the layers according to the number of contact points obtained when the screen is touched by any of user's fingers, thereby enabling the operation of the display object of an operation target. For example, the touch screen device enables the user to operate the display object disposed in an upper-layer when the number of contact points by any of the fingers is one (when the screen is touched by one finger), and enables the user to operate the display object disposed in a lower-layer when the number of contact points by any of the fingers is two (when the screen is touched by two fingers).

The touch screen device described in Document 1 however requires a user to grasp the number of fingers associated with each of the layers in order to choose a layer in which the display object as the operation target is disposed. Therefore, what is needed is to facilitate user operation.

SUMMARY

The present disclosure has been achieved in view of the above circumstances, and an object thereof is to provide an operating device, a lighting system and a non-transitory computer readable medium, capable of facilitating user operation.

An operating device according to an aspect of the present disclosure includes a display, a detector and a determiner. The display is configured to display, on one screen, an image represented by at least a first layer and a second layer which the first layer is stacked on. The first layer contains a first image part that is part of the image formed of first image data. The second layer contains a second image part that is another part of the image formed of second image data. The detector is configured to detect a designated position that is a position on the screen designated by a user. The determiner is configured to determine which one of display regions by the first image part or the second image part is chosen. The first image part is made by the first image data and the second image part is made by the second image data. Because of this, the determiner is configured to, when the detector detects the designated position, determine whether or not a position corresponding to the designated position in the first layer is within the display region of the first image part. The determiner is further configured to, when the position corresponding to the designated position in the first layer is within the display region of the first image part, determine that the display region of the first image part is chosen. The determiner is further configured to, when the position corresponding to the designated position in the first layer is not in the display region of the first image part, determine whether or not a position corresponding to the designated position in the second layer is within a display region of the second image part. The determiner is further configured to, when the position corresponding to the designated position in the second layer is within the display region of the second image part, determine that the display region of the second image part is chosen.

A lighting system according to an aspect of the present disclosure includes the operating device, light fixtures and a control device. The control device is configured to receive a determination result by the determiner in the operating device to control the light fixtures in accordance with the determination result.

A non-transitory computer readable medium of the determiner in the operating device, according to an aspect of the present disclosure stores a computer program to be executed as the determiner by at least one processor of the operating device. The computer program includes a first processing instruction, a second processing instruction, a third processing instruction and a fourth processing instruction. The first processing instruction is an instruction which causes the determiner to determine whether or not the position corresponding to the designated position in the first layer is within the display region by the first image data. The second processing instruction is an instruction which, when the position corresponding to the designated position in the first layer is within the display region by the first image data, causes the determiner to determine that the display region by the first image data is chosen. The third processing instruction is an instruction which, when the position corresponding to the designated position in the first layer is not in the display region by the first image data, causes the determiner to determine whether or not the position corresponding to the designated position in the second layer is within the display region by the second image data. The fourth processing instruction is an instruction which, when the position corresponding to the designated position in the second layer is within the display region by the second image data, causes the determiner to determine that the display region by the second image data has be chosen.

BRIEF DESCRIPTION OF THE DRAWINGS

The figures depict one or more implementations in accordance with the present teaching, by way of example only, not by way of limitation. In the figures, like reference numerals refer to the same or similar elements where:

FIGS. 3A and 3B show usage examples of the operating device, in which FIG. 3A illustrates a condition of the operating device before a user chooses an image (image data) and FIG. 3B illustrates a condition of the operating device after the user chooses the image;

FIGS. 4A, 4B, 4C and 4D show the operating device, in which FIG. 4A illustrates the position of first image data (of images) disposed in a first layer, FIG. 4B illustrates the position of second image data (of images) disposed in a second layer, FIG. 4C illustrates a positional relation between the first image data and the second image data, and FIG. 4D illustrates a positional relation between the first and second layers.

DETAILED DESCRIPTION

An operating device 100 in accordance with the present embodiment will be hereinafter explained with reference to FIGS. 1 to 5. For convenience of explanation, the operating device 100 will be explained in detail after a lighting system 500 equipped with the operating device 100 (see FIG. 2) is explained.

Figure 2:
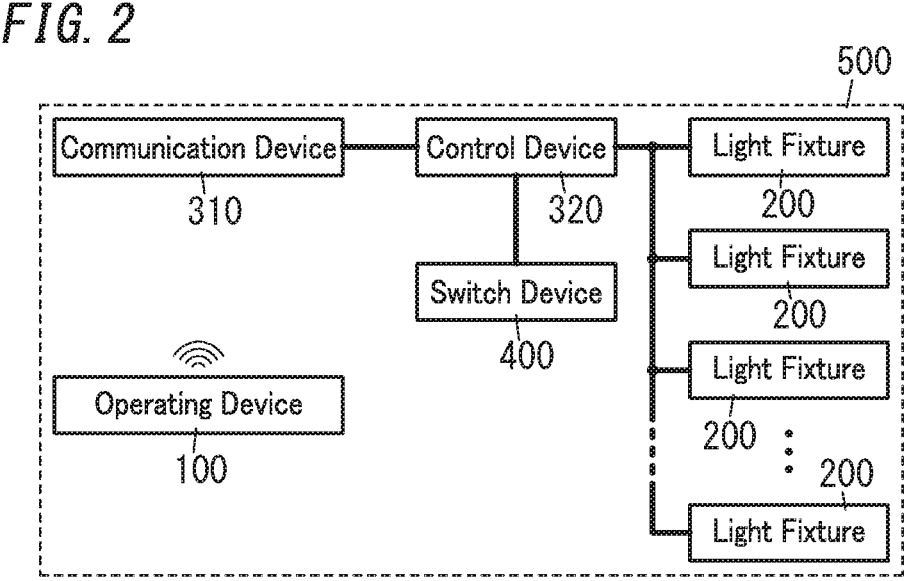
FIG. 2 is a block diagram of a lighting system with the operating device.

As shown in the example of FIG. 2, the lighting system 500 may include the operating device 100, light fixtures 200, a communication device 310, a control device 320 and a switch device 400. The lighting system 500 may be installed in, for example an office, a store or the like.

The operating device 100 is preferably configured to operate the light fixtures 200. In other words, the operating device 100 may be configured to control (change) respective lighting conditions of the light fixtures 200.

The communication device 310 is preferably configured to perform wireless communication with the operating device 100. For example, the communication device 310 may receive an operation signal (a first operation signal) from the operating device 100. Specifically, the communication device 310 may receive the first operation signal over a wireless communication medium such as infrared or radio. The first operation signal may be a signal for controlling (changing) the lighting conditions of the light fixtures 200. The communication device 310 may be also configured to provide the control device 320 with the first operation signal.

The control device 320 is preferably configured to control the light fixtures 200 according to the first operation signal from the communication device 310. In short, the control device 320 may control the light fixtures 200 according to an instruction from the operating device 100. The control device 320 may be also configured to control the light fixtures 200 according to a second operation signal from the switch device 400. The second operation signal may be a signal for controlling (changing) the lighting conditions of the light fixtures 200.

The switch device 400 is preferably configured to control (change) the lighting conditions of the light fixtures 200. For example, the switch device 400 may be a light switch (a wall-mounted switch).

Each of the light fixtures 200 may be installed on a ceiling of the office or the store. Each of the light fixtures 200 may have a function for controlling its own light output and a function for adjusting its own luminous color. Each of the light fixtures 200 is preferably configured to control (change) its own lighting condition in accordance with the control by the control device 320.

The operating device 100 may have, as its own modes, an operation mode for operating the light fixtures 200 and a setting mode for configuring the operating device 100. The setting mode enables making all or part of the light fixtures 200 form a group in accordance with a change of an operation range (a control range) of the light fixtures 200 caused by a change of indoor layout as a result of organizational change or increase or decrease of staff members. That is, the setting mode enables a user to set (change) the operation range of light fixtures 200 (the number of light fixtures 200 to be operated).

Figure 1:
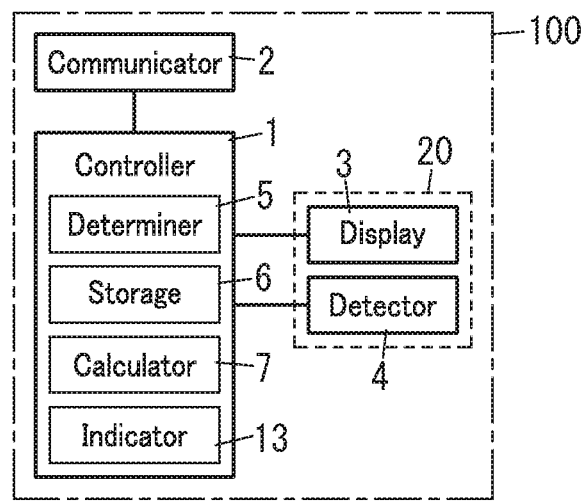
FIG. 1 is a block diagram of an operating device in accordance with an embodiment.

Preferably, the operating device 100 is a tablet equipped with a touch panel 20. As shown in the example of FIG. 1, the operating device 100 may include a controller 1, a communicator (a communication device) 2, a display (a display device) 3 and a detector 4. In the present embodiment, the display 3 and the detector 4 constitute the touch panel 20.

The controller 1 is preferably configured to control the communicator 2 and the display 3. The controller 1 may be at least one processor (microcomputer). The controller 1 may include a determiner 5, a storage (a storage device) 6, a calculator 7 and an indicator 13. The storage 6 may store a computer program that causes the processor(s) to function as the controller 1 (specifically, determiner 5, the calculator 7 and the indicator 13 and other functions). The computer program may be stored in the storage 6 in advance, or provided by a storage medium (e.g., a memory card) or through a computer network (e.g., the Internet). The indicator 13 is preferably configured to provide an instruction to all or part of the light fixtures 200. Specifically, the indicator 13 may provide all or part of the light fixtures 200 with an instruction to control (change) their respective lighting conditions in accordance with a determination result by the determiner 5. In the present embodiment, the indicator 13 is configured to output the first operation signal corresponding to the determination result by the determiner 5. The determiner 5 and the calculator 7 will be described later.

The communicator 2 is preferably configured to perform wireless communication with the communication device 310 (see FIG. 2) in accordance with the control of the controller 1. Specifically, the communicator 2 may transmit, to the communication device 310, the first operation signal output from the indicator 13. In this case, the communicator 2 may transmit the first operation signal to the communication device 310 over a wireless communication medium such as infrared or radio.

The display 3 is preferably configured to display an image represented by a set of image data 9 (see FIGS. 3A and 3B) on one screen 8 in accordance with the control of the controller 1. In the present embodiment, the display 3 is configured to display layers 10 on the screen 8. The layers 10 are stacked, and the set of image data 9 are individually assigned to the layers 10 (see FIGS. 4A to 4D). For example, the display 3 is a liquid crystal display.

Figure 3A:
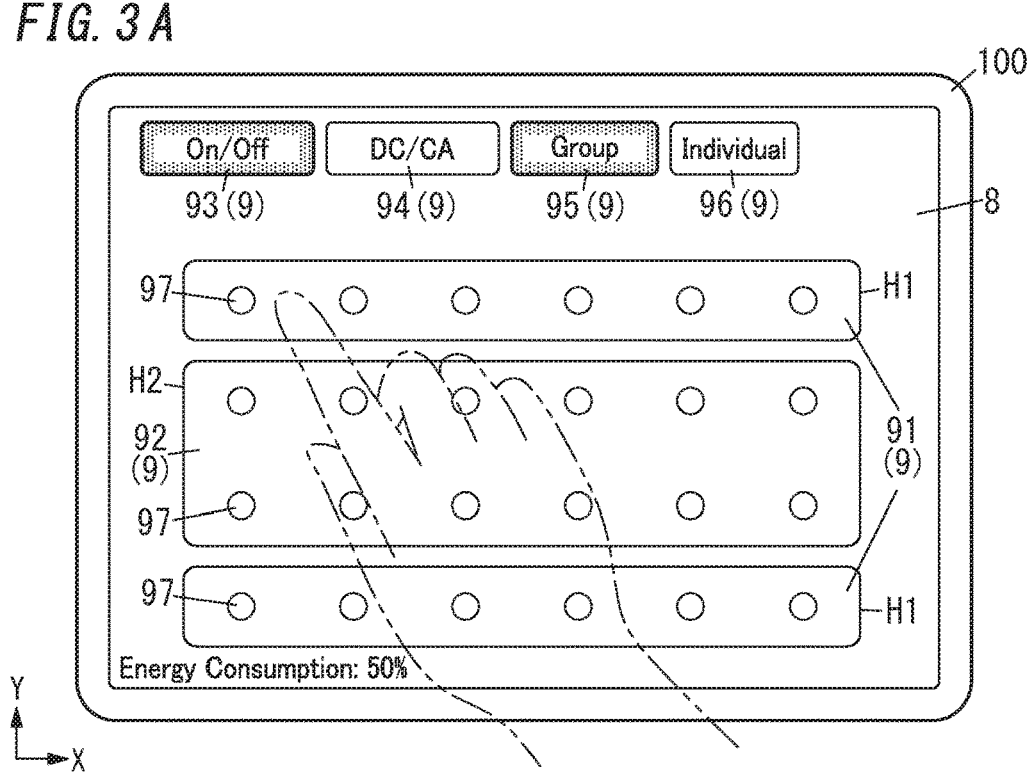
Figure 3B:
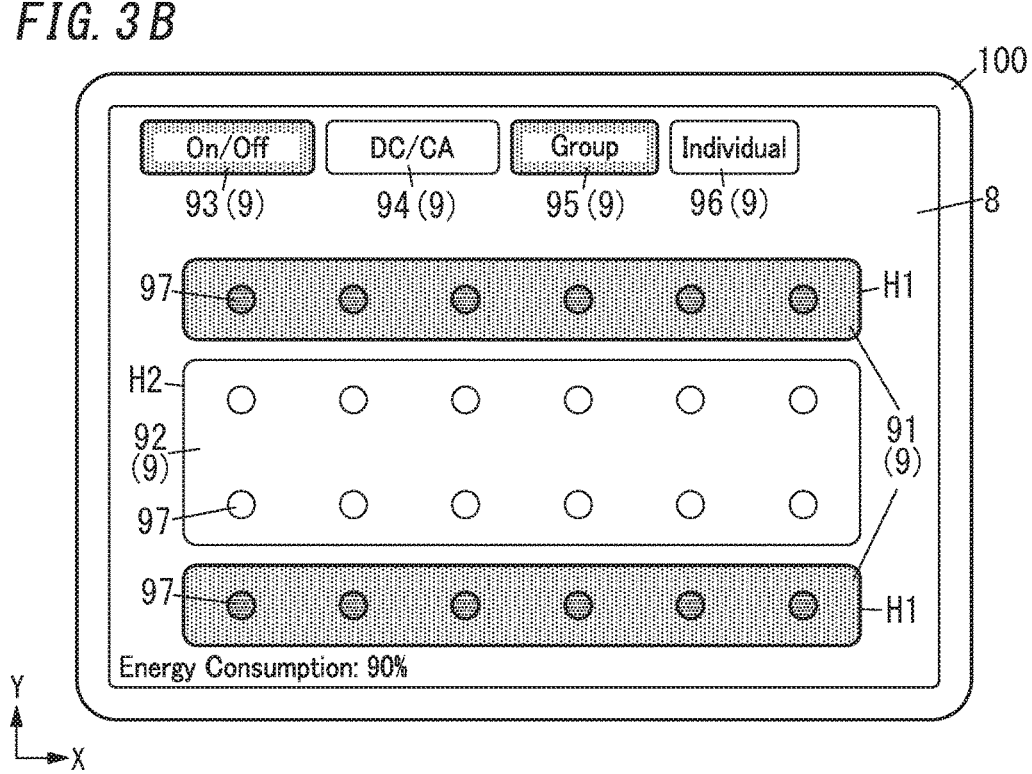

As shown in the examples of FIGS. 3A and 3B, the set of image data 9 may include first image data 91, second image data 92, third image data 93, fourth image data 94, fifth image data 95, sixth image data 96 and a set of (e.g., twenty-four pieces of) seventh image data 97. Note that the example of FIG. 3A illustrates the state in which a symbol (a display region) represented by the third image data 93 and a symbol (a display region) represented by the fifth image data 95 have been chosen in advance by a user. The example of FIG. 3B illustrates the state in which a display region H1 represented by the first image data 91, the symbol represented by the third image data 93 and the symbol represented by the fifth image data 95 have been chosen by the user. In FIGS. 3A and 3B, each halftone (halftone dot meshing) represents a state in which a display region represented by a corresponding image data has been chosen.

Hereinafter, the first to seventh image data 91 to 97 will be explained. In the example explained below, each of the third image data 93, the fourth image data 94, the fifth image data 95 and the sixth image data 96 forms an operation button icon. This sort of operation button icon may be a button as a conventional GUI (Graphical User Interface) part in place of image data so that a processing instruction corresponding to a press of the button is performed.

In the examples of FIGS. 3A and 3B, each of the first image data 91 and the second image data 92 forms a symbol of a button (an operation button) that enables a user to operate all or part of the light fixtures 200 (twelve light fixtures 200 in the examples) grouped by the user. Hereinafter, a group of light fixtures 200 corresponding to the first image data 91 is referred to "first light fixtures", and a group of light fixtures 200 corresponding to the second image data 92 is referred to "second light fixtures".

In the examples (see "On/Off" of 93), the third image data 93 forms the symbol of a button for turning on and off light fixtures 200 (e.g., the first light fixtures or the like) as a target group including one or more operation targets (operation devices). For example, if the user chooses and presses the button represented by the third image data 93 and then chooses and presses the button represented by the first image data 91, the first light fixtures can be lit and unlit at once.

In the examples (see "DC" (dimming control) and "CA" (color adjustment) of 94), the fourth image data 94 forms a symbol of a button for controlling and adjusting the light output and luminous color of light fixtures 200 as a target group. For example, if the user chooses and presses the button represented by the fourth image data 94 and then chooses and presses the button represented by the first image data 91, the light output and luminous color of the first light fixtures can be controlled and adjusted at once. In this case, the operating device 100 may display, on the screen 8 of the display 3, an additional panel (operation panel) for controlling and adjusting the light output and luminous color of the first light fixtures at once.

In the examples, the fifth image data 95 forms the symbol of a button for operating the first light fixtures and the second light fixtures at once (see "Group" of 95). The sixth image data 96 forms a symbol of a button for individually operating the light fixtures 200 (see "Individual" of 96). Each of the set of seventh image data 97 forms a symbol of a button that schematically depicts a corresponding light fixture 200 and used to operate the corresponding light fixture 200. In the present embodiment, each of the set of seventh image data 97 represents the symbol of a corresponding electric device (light fixture 200).

Figure 4A:
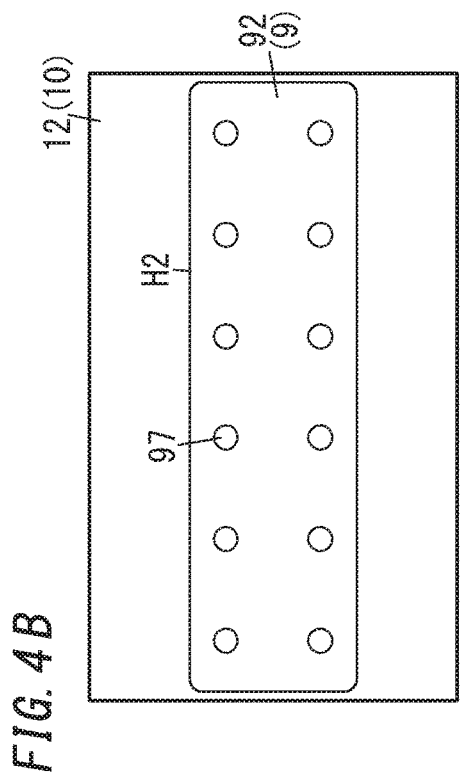
Figure 4B:
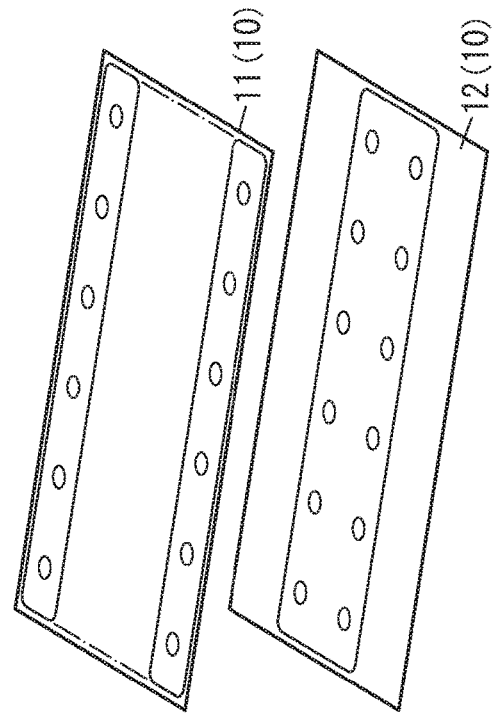
Figure 4C:
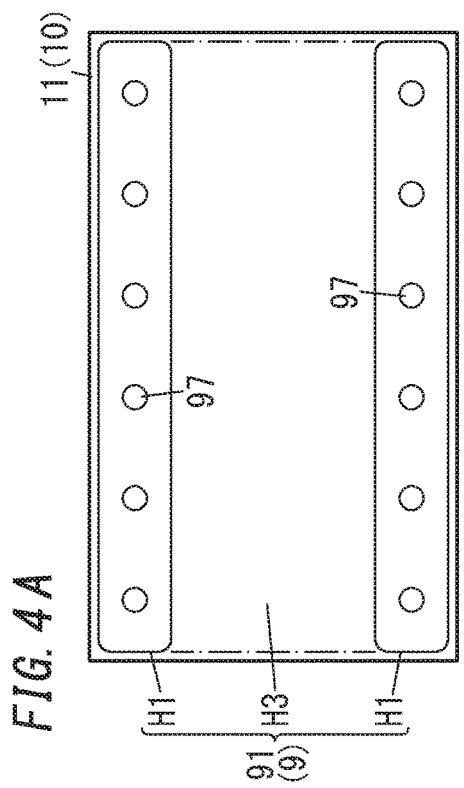

In the example of FIG. 4A, the first image data 91 forms the display region H1 including two areas, each of which surrounds the symbols represented by a set of (in the example, six pieces of) seventh image data 97, and a non-display region H3 different from the display region H1. The display region H1 is preferably composed of opaque pixel elements (a set of opaque pixel data). The non-display region H3 is preferably composed of transparent pixel elements (a set of transparent pixel data). In the example of FIG. 4B, the second image data 92 form only the display region H2 that surrounds the symbols represented by a set of (in the example, twelve pieces of) seventh image data 97. The display region H2 is preferably composed of opaque pixel elements (a set of opaque pixel data). Note that as shown in FIG. 4A the display region H1 by the first image data 91 means a region, in each area of which the symbols represented by the set of (e.g., the six pieces of) seventh image data 97 in the first image data 91 are present. The non-display region H3 by the first image data 91 means a region which does not include any symbol by every seventh image data 97 in the first image data 91. In the example of FIG. 4B, the display region H2 by the second image data 92 means a region which includes the symbols represented by the set of (the twelve pieces of) seventh image data 97 in the second image data 92. The transparent pixel elements do not mean having physical transparency. That is, they mean having graphical transparency. For example, the transparent pixel elements may have the permeability of approximately 100%. In fact, when opaque pixel elements are present in a lower-layer, the opaque pixel elements in the lower-layer influence the transparent pixel elements. In the present embodiment, each of the display region H1 by the first image data 91 and the display region H2 by the second image data 92 corresponds to a first region, and the non-display region H3 by the first image data 91 corresponds to a second region.

Figure 4D:
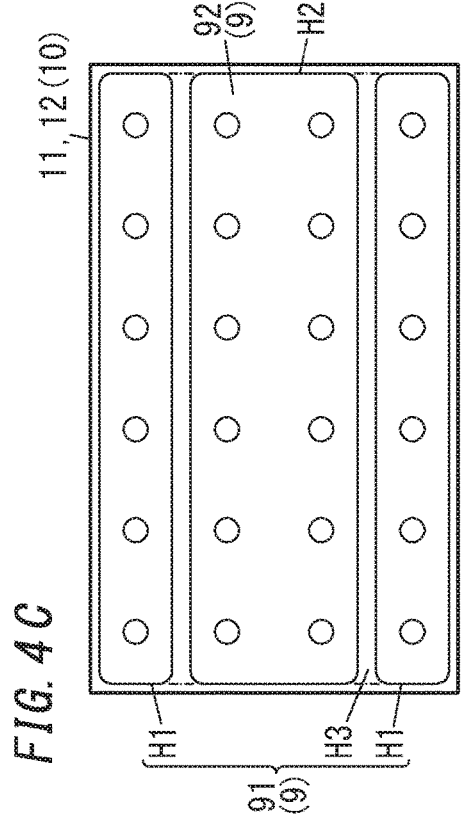

In the examples of FIGS. 4A to 4D, the layers 10 include a first layer 11 and a second layer 12. The layers 10 also include third to eighth layers although not illustrated here. As shown in the example of FIG. 4D, the first layer 11 may be disposed on the second layer 12. The second layer 12 may be disposed on the third layer. The third layer may be disposed on the fourth layer. The fourth layer may be disposed on the fifth layer. The fifth layer may be disposed on the sixth layer. The sixth layer may be disposed on the seventh layer. The seventh layer may be disposed on the eighth layer. In this case, the first layer 11 is the highest layer.

In the present embodiment, the first layer 11, second layer 12, third layer, fourth layer, fifth layer and sixth layer are associated with the first image data 91, second image data 92, third image data 93, fourth image data 94, fifth image data 95 and sixth image data 96, respectively. The seventh layer is associated with the set of (e.g., the twenty-four pieces of) seventh image data 97. The eighth layer is associated with a layout chart of the office or the store. Preferably, the symbols represented by the set of seventh image data 97 are disposed at respective positions in the seventh layer corresponding to respective locations of the light fixtures 200 in the layout chart of the eighth layer. In the present embodiment, the display region H2 by the second image data 92 is disposed in a region of the second layer 12 corresponding to a region of the first layer 11 which does not include the display region H1 by the first image data 91, which are displayed on the screen 8 of the display 3.

The detector 4 is preferably configured to detect a designated position that is a position, on the screen 8, designated by a user. In the example of FIG. 3A, the position on the screen 8 designated by the user means a position of the screen 8 to be touched with user's finger (forefinger). The detector 4 may be configured to, when detecting the designated position, transmit the information on the designated position (position information) to the controller 1. The position information may contain the x-coordinate and the y-coordinate on the screen 8.

The determiner 5 is preferably configured to determine which display region by the set of image data 9 has been chosen based on the position information from the detector 4. Hereinafter, an operation (a determining operation)

example by the determiner 5 will be explained with reference to the flow chart of FIG. 5.

Figure 5:
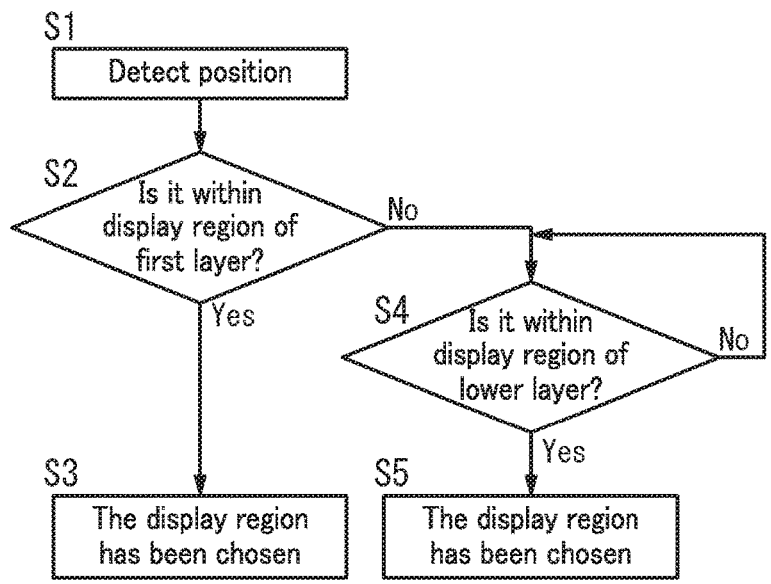
FIG. 5 is a flow chart showing the operation of a determiner in the operating device.

When the detector 4 detects a designated position (S1 in FIG. 5), the determiner 5 determines whether or not a position, corresponding to the designated position, in the first layer 11 is within the display region H1 by the first image data 91 (S2 in FIG. 5). In this example, the position corresponding to the designated position in the first layer 11 means a position in the first layer 11 that overlaps with the designated position that is the position designated by the user on the screen 8 of the display 3.

When the position corresponding to the designated position in the first layer 11 is within the display region H1 by the first image data 91 (S2: Yes), the determiner 5 determines that the display region H1 by the first image data 91 has been chosen (S3 in FIG. 5). When the position corresponding to the designated position in the first layer 11 is not in the display region H1 by the first image data 91 (S2: No), the determiner 5 determines whether or not a position corresponding to the designated position in the second layer 12 is within the display region H2 by the second image data 92 (S4 in FIG. 5). The position corresponding to the designated position in the second layer 12 means a position in the second layer 12 that overlaps with the designated position that is the position designated by the user on the screen 8 of the display 3.

When the position corresponding to the designated position in the second layer 12 is within the display region H2 by the second image data 92 (S4: Yes), the determiner 5 determines that the display region H2 by the second image data 92 has been chosen (S5 in FIG. 5). When the position corresponding to the designated position in the second layer 12 is not in the display region H2 by the second image data 92 (S4: No), the determiner 5 determines whether or not a position corresponding to the designated position in the third layer is within the display region by the third image data 93 (S4). Determining as to the position corresponding to the designated position in the third layer is performed like determining as to the position corresponding to the designated position in the second layer 12, and description thereof is omitted. The determiner 5 determines as to a position corresponding to the designated position in the fourth or lower layer in the same way as determining as to the position corresponding to the designated position in the third layer.

In the present embodiment, the determiner 5 may determine whether or not the first image data 91 have transparent pixel elements at the position corresponding to the designated position in the first layer 11, thereby determining whether or not the position corresponding to the designated position in the first layer 11 is within the display region H1 by the first image data 91. For example, when the first image data 91 have opaque pixel elements at the position corresponding to the designated position in the first layer 11, the determiner 5 may determine that the position corresponding to the designated position in the first layer 11 is within the display region H1 by the first image data 91. When the first image data 91 have transparent pixel elements at the position corresponding to the designated position in the first layer 11, the determiner 5 may determine that the position corresponding to the designated position in the first layer 11 is not in the display region H1 by the first image data 91.

In the present embodiment, the determiner 5 may also determine whether or not the second image data 92 have transparent pixel elements at the position corresponding to the designated position in the second layer 12, thereby determining whether or not the position corresponding to the designated position in the second layer 12 is within the display region H2 by the second image data 92. For example, when the second image data 92 have opaque pixel elements at the position corresponding to the designated position in the second layer 12, the determiner 5 may determine that the position corresponding to the designated position in the second layer 12 is within the display region H2 by the second image data 92. When the second image data 92 have transparent pixel elements at the position corresponding to the designated position in the second layer 12, the determiner 5 may also determine that the position corresponding to the designated position in the second layer 12 is not in the display region H2 by the second image data 92.

The controller 1 is preferably configured to provide the first operation signal to the communicator 2 based on a determination result by the determiner 5. In other words, the controller 1 may be configured to perform respective processing instructions associated with the set of image data 9 based on the determination result by the determiner 5. As shown in the example of FIG. 3A, in case the symbols represented by the third image data 93 and the fifth image data 95 have been chosen, the controller 1 may provide the communicator 2 with the first operation signal containing an instruction to light (turn on) the first light fixtures, if the first light fixtures are unlit when the determiner 5 determines that the display region H1 by the first image data 91 has been chosen and part thereof has been pressed. In this case, if the first light fixtures are lit when the determiner 5 determines that the display region H1 by the first image data 91 has been chosen and part thereof has been pressed, the controller 1 may provide the communicator 2 with the first operation signal containing an instruction to distinguish (turn off) the first light fixtures. Preferably, the communicator 2 provides the communication device 310 with the first operation signal from the controller 1. The control device 320 may control (change) the lighting conditions of the first light fixtures in accordance with the first operation signal to be received by the communication device 310. Thus, the operating device 100 enables a user to control (change) the lighting conditions of the first light fixtures. That is, the user can control (change) the light fixtures 200 over the operating device 100 at hand.

The determiner 5 may be realized by execution of the aforementioned computer program by the processor (microcomputer) mainly constituting the controller 1. In short, the computer program is to be executed as the determiner 5 by at least one processor (microcomputer) of the operating device 100. As an example, the computer program may contain a first processing instruction, a second processing instruction, a third processing instruction and a fourth processing instruction. The first processing instruction may be an instruction which causes the determiner 5 to determine whether or not a position, corresponding to a designated position, in the first layer 11 is within the display region H1 by the first image data 91. The second processing instruction may be an instruction which causes the determiner 5 to determine that the display region H1 by the first image data 91 has been chosen, when the position corresponding to the designated position in the first layer 11 is within the display region H1 by the first image data 91. The third processing instruction may be an instruction which causes the determiner 5 to determine whether or not a position corresponding to the designated position in the second layer 12 is within the display region H2 by the second image data 92, when the position corresponding to the designated position in the first layer 11 is not in the display region H1 by the first image data 91. The fourth processing instruction may be an instruction which causes the determiner 5 to determine that the display region H2 by the second image data 92 has be chosen, when the position corresponding to the designated position in the second layer 12 is within the display region H2 by the second image data 92.

The calculator 7 is preferably configured to calculate energy consumption of light fixtures 200 corresponding to the first image data 91 or the second image data 92, a display region of which has been chosen by the user. The calculator 7 may calculate the energy consumption of the light fixtures 200 based on a color temperature and a dimming ratio of the light fixtures 200.

The controller 1 is preferably configured to display the energy consumption of the light fixtures 200 calculated through the calculator 7 on the screen 8 of the display 3. Such energy consumption is represented by each of "Energy Consumption: 50%" and "Energy Consumption: 90%" in the examples of FIGS. 3A and 3B. In the present embodiment, the energy consumption of light fixtures 200 is 100% when they are lit at a rated power.

The operating device 100 may be configured to display the energy consumption of light fixtures 200 on the screen 8 of the display 3 when the user operates the light fixtures 200 as the target group. The operating device 100 can accordingly visualize the energy consumption of the light fixtures 200 as the target group when the user controls (changes) the lighting conditions of the light fixtures 200 as the target group.

In the case of the touch screen device described in Document 1 (hereinafter referred to as a "related touch screen device"), operating of the display object requires a user to choose a layer in which the display object of the operation target is disposed. The user therefore needs to grasp the number of fingers assigned to each of the layers.

In contrast, in the case of the operating device 100, the display region H1 by the first image data 91 and the display region H2 by the second image data 92 are disposed in the first layer 11 and the second layer 12, respectively (see FIGS. 4A to 4D). When a user chooses the display region H2 by the second image data 92 and presses part thereof on the screen 8, the processing instruction associated with the second image data 92 is performed. That is, the operating device 100 does not require the user to choose any one layer 10 in which a display region by image data 9 corresponding to a target group is disposed, unlike the related touch screen device. With the operating device 100, it is accordingly possible to facilitate user operation in comparison with the related touch screen device.

As explained above, an operating device 100 according to an embodiment includes a display 3, a detector 4 and a determiner 5. The display 3 is configured to display, on one screen 8, an image represented by at least a first layer 11 and a second layer 12 which the first layer 11 is stacked on. The first layer 11 contains part of the image formed of first image data 91 (first image part) and the second layer 12 contains another part of the image formed of second image data 92 (second image part). The detector 4 is configured to detect a designated position that is a position on the screen 8 designated by a user. The determiner 5 is configured to determine which one of display regions by first image data 91 and second image data 92 is chosen. Because of this, the determiner 5 is configured to, when the detector 4 detects the designated position, determine whether or not a position corresponding to the designated position in the first layer 11 is within the display region H1 by the first image data 91. The determiner 5 is further configured to, when the position corresponding to the designated position in the first layer 11 is within the display region H1 by the first image data 91, determine that the display region H1 by the first image data 91 is chosen. The determiner 5 is further configured to, when the position corresponding to the designated position in the first layer 11 is not in the display region H1 by the first image data 91, determine whether or not a position corresponding to the designated position in the second layer 12 is within the display region H2 by the second image data 92. The determiner 5 is further configured to, when the position corresponding to the designated position in the second layer 12 is within the display region H2 by the second image data 92, determine that the display region H2 by the second image data 92 is chosen.

With this configuration of the operating device 100, when the user chooses, for example the display region H2 by the second image data 92, the determiner 5 can determine that the display region H2 by the second image data 92 has been chosen based on a detection result by the detector 4 without choosing the second layer 12 in advance, unlike the related touch screen device. The operating device 100 can accordingly facilitate user operation in comparison with the related touch screen device.

Preferably, each of the first image data 91 and the second image data 92 includes a first region surrounding one or more symbols (a set of seventh image data 97) representing electric devices (light fixtures 200), and a second region different from the first region. Preferably, the first region is composed of opaque pixel elements (a set of opaque pixel data). Preferably, the second region is composed of transparent pixel elements (a set of transparent pixel data). The determiner 5 may be configured to, when the first image data 91 have opaque pixel elements at the position corresponding to the designated position in the first layer 11, determine that the position corresponding to the designated position in the first layer 11 is within the display region H1 by the first image data 91. The determiner 5 may be also configured to, when the first image data 91 have transparent pixel elements at the position corresponding to the designated position in the first layer 11, determine that the position corresponding to the designated position in the first layer 11 is not in the display region H1 by the first image data 91. The determiner 5 may be further configured to, when the second image data 92 have opaque pixel elements at the position corresponding to the designated position in the second layer 12, determine that the position corresponding to the designated position in the second layer 12 is within the display region H2 by the second image data 92.

Even with this configuration of the operating device 100, when the user chooses, for example the display region H2 by the second image data 92, the determiner 5 can determine that the display region H2 by the second image data 92 has been chosen based on a detection result by the detector 4 without choosing the second layer 12 in advance, unlike the related touch screen device.

A lighting system 500 according to an embodiment includes the operating device 100, light fixtures 200 and a control device 320. The control device 320 is configured to receive a determination result by the determiner 5 in the operating device 100 to control the light fixtures 200 in accordance with the determination result.

With this configuration of the lighting system 500, it is possible to provide lighting systems equipped with the operating device 100 capable of facilitating user operation.

A non-transitory computer readable medium 600 of the determiner 5 in the operating device 100, according to an embodiment (see FIG. 6) stores a computer program 610 to be executed as the determiner 5 by at least one processor (computer) of the operating device 100. The computer program 610 contains a first processing instruction 620, a second processing instruction 630, a third processing instruction 640 and a fourth processing instruction 650. The first processing instruction 620 may be an instruction which causes the determiner 5 to determine whether or not the position, corresponding to the designated position, in the first layer 11 is within the display region H1 by the first image data 91. The second processing instruction 630 is an instruction which, when the position corresponding to the designated position in the first layer 11 is within the display region H1 by the first image data 91, causes the determiner 5 to determine that the display region H1 by the first image data 91 has been chosen. The third processing instruction 640 is an instruction which, when the position corresponding to the designated position in the first layer 11 is not in the display region H1 by the first image data 91, causes the determiner 5 to determine whether or not the position corresponding to the designated position in the second layer 12 is within the display region H2 by the second image data 92. The fourth processing instruction 650 is an instruction which, when the position corresponding to the designated position in the second layer 12 is within the display region H2 by the second image data 92, causes the determiner 5 to determine that the display region H2 by the second image data 92 has be chosen.

Examples of the non-transitory computer readable medium may include: semiconductor memories such as RAMS, ROMs, EEPROMs and FLASH memories; optical disk storages such as CD-ROMs, compact discs (CDs), laser discs, digital versatile discs (DVDs) and Blu-ray discs; magnetic storage media such as hard disks, floppy disks and magnetic recording tape. In an example, the non-transitory computer readable medium may be equipped for a computer server configured to provide the computer program thereof through a network (e.g., the Internet).

Figure 6:
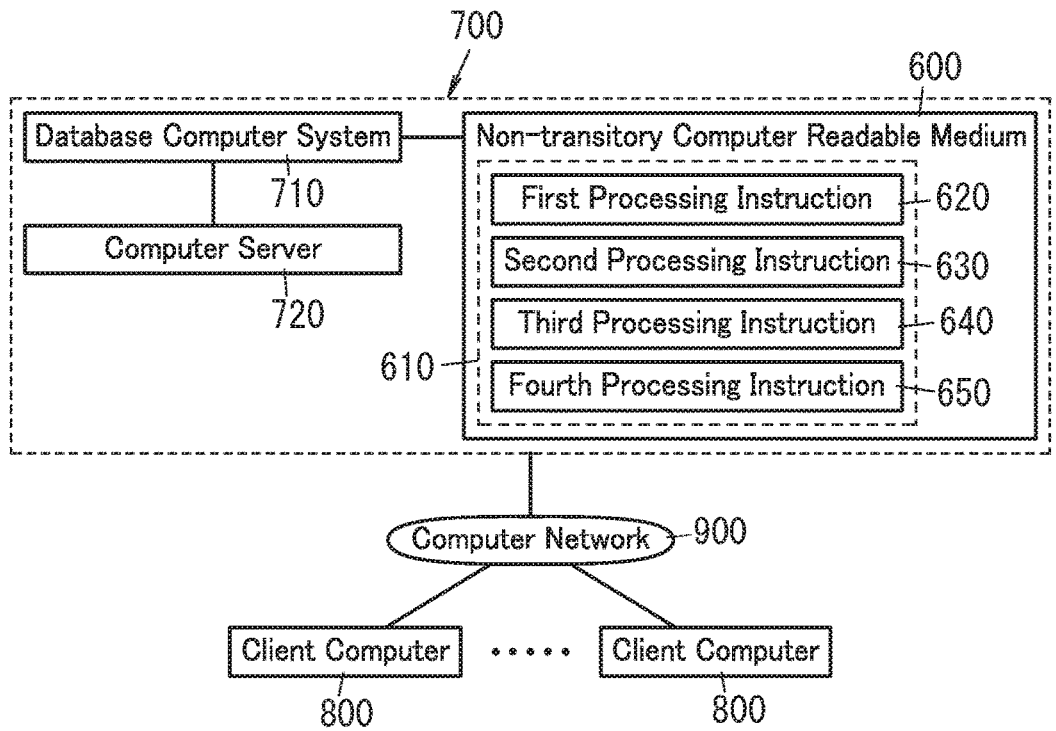
FIG. 6 is a block diagram of a computer server system.

A computer server system 700 according to an embodiment includes a database computer system 710 and a computer server 720, as shown in FIG. 6. The database computer system 710 is equipped with the non-transitory computer readable medium 600 (e.g., a hard disk). The computer server 720 is configured to provide the computer program 610 stored in the non-transitory computer readable medium 600 among client computers 800 via a computer network 900 (e.g., the Internet). The database computer system 710 and the computer server 720 may be composed of one or more processors.

With this configuration, it is possible to provide a non-transitory computer readable medium capable of facilitating user operation.

In the explanation of the examples shown in the drawings, the first light fixtures or the second light fixtures are operated at once, but the operating device 100 may be configured to individually operate the light fixtures 200.

A designated position that is a position on the screen 8 designated by a user is not limited to a contact position of a user's finger on the screen 8, but may be a position on the screen 8 touched through a pen (a touch pen) by the user.

The operating device 100 is not limited to the tablet, but examples thereof may further include a smartphone, a personal computer and the like. In the case of the personal computer, a designated position that is a position on the screen 8 designated by a user may be a position of a mouse pointer displayed on a monitor of the personal computer. The operating device 100 may include not only a transmitter function but also a receiver function.

Each of the light fixtures 200 may include not only a receiver function but also a transmitter function.

Examples of the electric devices may include not only light fixtures but also air conditioning equipment.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An operating device, comprising:
a display configured to display, on one screen, an image represented by at least a first layer and a second layer on which the first layer is stacked, the first layer containing a first image part that is a part of the image formed of first image data, the second layer containing a second image part that is another part of the image formed of second image data;
a detector configured to detect a designated position that is a position on the screen designated by a user; and
a determiner configured to determine which one of display regions by the first image part or the second image part is chosen by:
when the detector detects the designated position, determining whether or not a position corresponding to the designated position in the first layer is within the display region of the first image part,
when the position corresponding to the designated position in the first layer is within the display region of the first image part, determining that the display region of the first image part is chosen,
when the position corresponding to the designated position in the first layer is not in the display region of the first image part, determining whether or not a position corresponding to the designated position in the second layer is within a display region of the second image part,
when the position corresponding to the designated position in the second layer is within the display region of the second image part, determining that the display region of the second image part is chosen,
each of the first image data and the second image data includes a first region surrounding one or more symbols representing electric devices, and a second region different from the first region, the first region being composed of opaque pixel elements, the second region being composed of transparent pixel elements;
the determiner is further configured to
when the first image part has opaque pixel elements at the position corresponding to the designated position in the first layer, determine that the position corresponding to the designated position in the first layer is within the display region of the first image part,
when the first image part has transparent pixel elements at the position corresponding to the designated position in the first layer, determine that the position corresponding to the designated position in the first layer is not in the display region of the first image part, and
when the second image part has opaque pixel elements at the position corresponding to the designated position in the second layer, determine that the position corresponding to the designated position in the second layer is within the display region of the second image part.

2. A lighting system, comprising:
the operating device of claim 1;
light fixtures as the electric devices; and
a control device configured to receive a determination result by the determiner in the operating device to control the light fixtures in accordance with the determination result.

3. A non-transitory computer readable medium, the computer readable medium storing a computer program to be executed as the determiner in the operating device of claim 1 by at least one processor of the operating device, wherein the computer program comprises:
a first processing instruction which causes the determiner to determine whether or not the position corresponding to the designated position in the first layer is within the display region by the first image data;
a second processing instruction which, when the position corresponding to the designated position in the first layer is within the display region by the first image data, causes the determiner to determine that the display region by the first image data is chosen,
a third processing instruction which, when the position corresponding to the designated position in the first layer is not in the display region by the first image data, causes the determiner to determine whether or not the position corresponding to the designated position in the second layer is within the display region by the second image data; and
a fourth processing instruction which, when the position corresponding to the designated position in the second layer is within the display region by the second image data, causes the determiner to determine that the display region by the second image data has be chosen.

4. A computer server system, comprising:
a database computer system which is equipped with the non-transitory computer readable medium of claim 3; and
a computer server configured to provide the computer program stored in the non-transitory computer readable medium among client computers via a computer network.

* * * * *